Jan. 29, 1924.
J. G. COFFIN
1,481,986
METHOD AND APPARATUS FOR MEASURING ALTITUDES
Filed Nov. 16, 1918    2 Sheets-Sheet 1
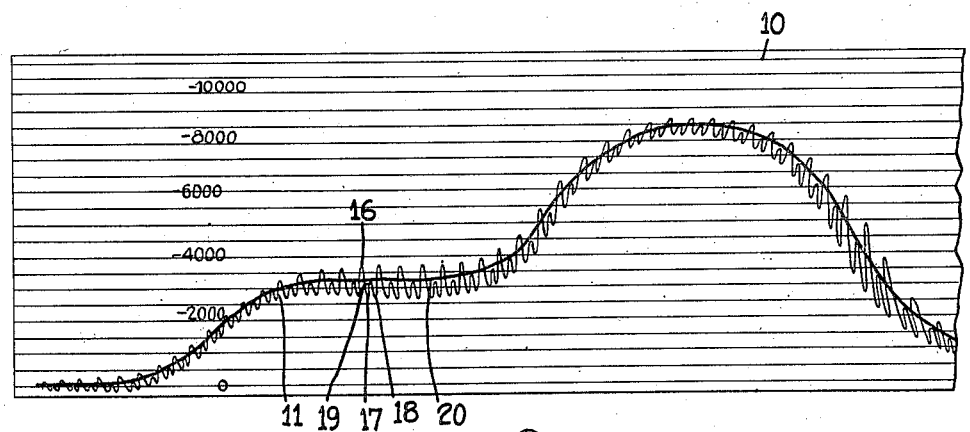
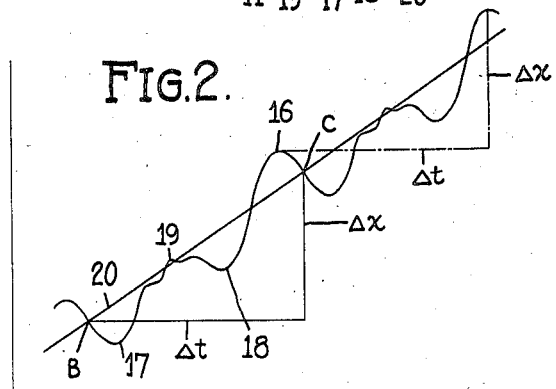
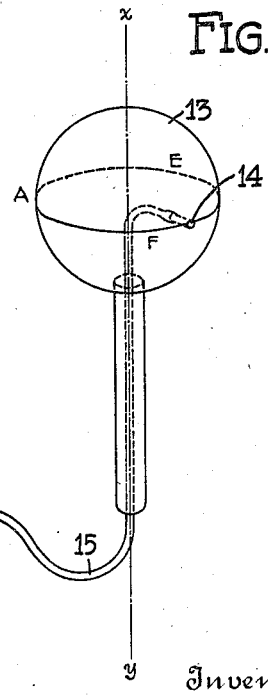
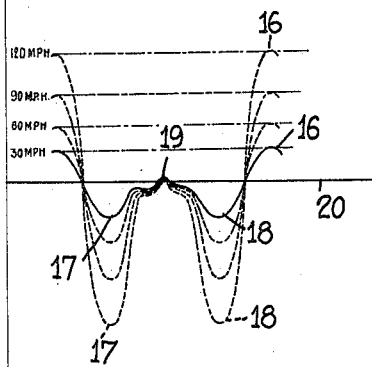
Inventor
JOSEPH G. COFFIN.
By his Attorney Jan. 29, 1924. 1,481,986
J. G. COFFIN
METHOD AND APPARATUS FOR MEASURING ALTITUDES
Filed Nov. 16, 1918 2 Sheets-Sheet 2
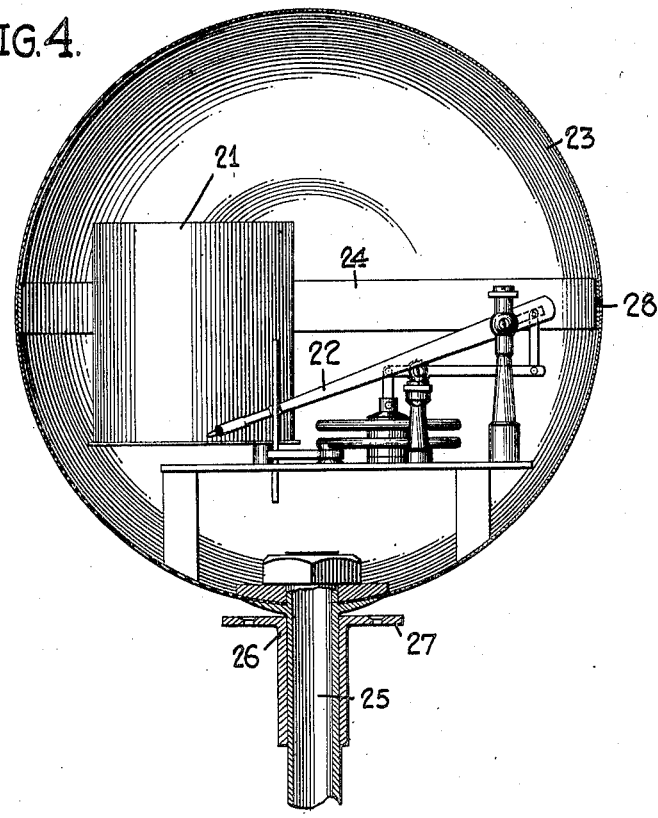
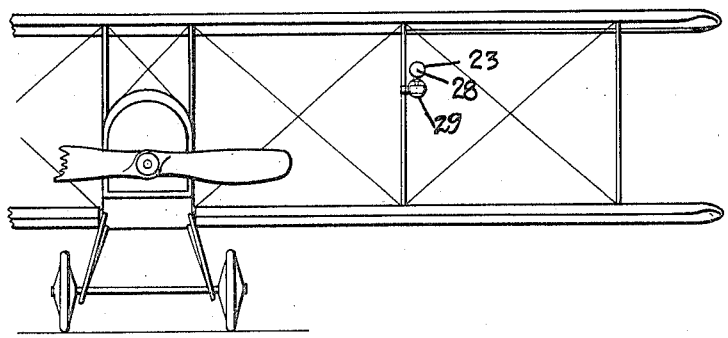
Inventor
JOSEPH G. COFFIN.
By his Attorney

Patented Jan. 29, 1924.

1,481,986

UNITED STATES PATENT OFFICE.

JOSEPH G. COFFIN, OF GARDEN CITY, NEW YORK, ASSIGNOR, BY MESNE ASSIGNMENTS, TO CURTISS AEROPLANE AND MOTOR COMPANY, INC., OF GARDEN CITY, NEW YORK, A CORPORATION OF NEW YORK.

METHOD AND APPARATUS FOR MEASURING ALTITUDES.

Application filed November 16, 1918. Serial No. 262,908.

*To all whom it may concern:*

Be it known that I, JOSEPH G. COFFIN, a citizen of the United States, residing at Garden City, in the county of Nassau and State of New York, have invented certain new and useful Improvements in Methods and Apparatus for Measuring Altitudes, of which the following is a specification.

This invention relates to the art of measuring the altitude, rate of climb and the air velocity of aircraft, particularly aircraft of the aeroplane type embodying mechanical means for the propulsion thereof thru the air.

The invention contemplates both a novel method and an apparatus for effecting these measurements and a particular advantage thereof is that the altitude, rate of climb and air velocity may be simultaneously determined from records made by the instrument.

As is well known, the altitude of the craft is determined at the present time by instruments of various types for measuring the static pressures, as for instance the aneroid barometer and other types of altimeters. In the case of aircraft, however, which are mechanically propelled thru the air, these static pressure instruments do not give the true static pressures, but only the apparent static pressures, the errors in the readings being due to the aerodynamic pressure or due to the flow of air past the instrument. The error in the measurement given by the instrument may be either additive or subtractive, depending upon whether the effective opening of the instrument or its intake if a specific intake is provided, is in such position that the aerodynamic pressure adds to or subtracts from the true static pressure. For instance, if the instrument takes air from a leading point the pressure given is greater than the true static pressure by an amount equal to the effective aerodynamic pressure at that point, whereas if air is taken from a trailing point the pressure given is usually less than the true static pressure by an amount equal to the effective aerodynamic pressure at that point. The error in the static pressure thus given and consequently the error in the corresponding altitude may be very great in certain cases and varies substantially with the square of the speed, for example, at a relative velocity of the craft and wind of 60 M. P. H. the velocity head or plus error may be as much as 120 feet and a greater negative error than this may be expected. At a velocity of 120 M. P. H. the altitude error will be substantially four times the error at 60 M. P. H. or 480 ft. This error cannot be obviated by enclosing the instrument in the fuselage or in the usual casing, since the air immediately surrounding the instrument and within the casing partakes of the variations in pressure outside. Moreover, to position the effective intake at a neutral point or a point where the aerodynamic pressure is nil does not overcome the difficulty as such a point is uncertain and varies with changes in direction of the air about the instrument, and hence adjustment of the instrument intake is ineffectual.

In accordance with my invention I obviate these errors in static readings due to the aerodynamic pressure and I accomplish this by measuring (and preferably recording) both the leading and the trailing pressures about the instrument. The trailing and leading pressures thus obtained are the algebraic sums of the true static pressure and the aerodynamic pressure and from these values the true static pressure may be determined as by calibration.

Since the leading pressure recorded is greater than true static pressure and the trailing pressure is less than the static, the true static pressure lies between these measured values. Its exact position relative to the leading and trailing pressures is determined by a preliminary calibration on the instrument, as for instance by means of a wind tunnel test.

In the practice of my invention I may use any pressure indicating instrument or apparatus of the desired sensitiveness, as for instance an aneroid barometer of the recording type, and I so arrange and mount the instrument upon the craft that it may be subjected successively to the leading and trailing pressures in the free air stream. The responsive parts of the instrument are enclosed in a substantially air tight casing and its intake so arranged that it may be shifted from points trailing to points leading. It is obvious that either the instrument as a whole may be moved from one position to another or the instrument itself may remain stationary and the intake may be shifted so long as the instrument is subjected alternately to leading and trailing pressures. It is essential that the intake make a substantially air tight connection with the instrument in order to render the instrument sensitive to air pressure only at the points being measured. The instrument thereby is caused to successively measure the leading and trailing pressures which are merely the apparent static pressures and a record is made in the nature of a wavy line, the wave being transverse to the direction of movement of the record sheet. An average line may be drawn thru this wavy line which will give the true static pressure line and this may be checked once for all and calibrated by wind tunnel tests as above indicated. The instrument may be oscillated or rotated or otherwise actuated by any suitable means as for instance by the conventional clockwork. In the embodiment of the apparatus set forth in this application I have illustrated a spherical casing as the moving body about which the leading and trailing pressures are to be determined, this casing having a single intake which is alternately caused to induct air from points leading and trailing, but it is understood that both the form and arrangement of the instrument and the moving body may be varied without departing from the spirit of the invention.

An important feature of my invention is that it permits of the simultaneous measurement or determination of the altitude, air velocity and rate of climb from the measurements and records given by the instrument. For instance, the amplitudes of the waves above and below the average line depend upon the aerodynamic pressures which in turn are measures of the air speeds. The amplitudes of the waves may therefore be taken as measures of the air velocities and the instrument adjusted and calibrated to accurately give these values. Moreover, if the instrument is actuated (rotated or oscillated) at a uniform rate, as by a clockwork, the rate of climb may be determined from the slope of the record made, for instance, the vertical distance travelled per unit of revolution (or oscillation) is a measure of the rate of climb. All these measurements are thereby simultaneously obtainable and recorded on a single permanent record.

For a better understanding of the advantageous features of my invention above enumerated and others which will hereinafter appear reference may be had to the following drawings which illustrate one embodiment of the many forms my invention is capable of assuming, wherein—

Fig. 1 illustrates a record sheet produced according to the method of my invention.

Fig. 2 is an enlarged view of a portion of a record produced by a specific apparatus, Fig. 3 is a diagrammatic illustration of a portion of the apparatus for carrying out my invention, Fig. 4 is a part sectional and elevational view illustrating a specific apparatus for carrying out my invention, and Fig. 5 is a view illustrating a suggested location of the instrument on the craft.

Referring to the drawings wherein like numerals designate similar parts throughout, 10 indicates a typical record sheet as used on static instruments of the aneroid barometer type, this record being driven or actuated in the usual manner as for instance by a clock work. The record usually produced or traced upon this record sheet is a line indicating the apparent static pressures, this apparent static pressure being greater than the true static pressure depending upon the effect of the aerodynamic pressure upon the instrument. If the intake of the instrument is so positioned that the head or air velocity has a greater effect than the trailing velocity, then the apparent pressure as given by the static instrument is greater than the true static pressure, the error in altitude thus given being plus. On the other hand if the instrument takes its indicating air from a point or points trailing the instrument the record made may be expected to be below the true static pressure line.

In accordance with my invention I measure successively the trailing and leading pressures, thereby obtaining values which are alternately greater and less than the true static pressure and from which values the true static pressure may be determined. In carrying out the invention I may use any type of instrument sensitive to the aerodynamic and barometric pressures for measuring or indicating the values, but preferably I use an instrument of the recording type employing a record sheet like that designated 10 in Fig. 1. Upon this sheet I make a record of both the trailing and leading pressures and if a curve is drawn thru these record points as established on the record sheet it will be found to be a wavy line having maximum and minimum values not unlike the wavy line 11 illustrated on this sheet. In Fig. 3 is diagrammatically illustrated an apparatus for carrying out my invention embodying a pressure indicating instrument 12, a spherical body or container 13 and an intake 14 carried by the container. The container 13 is oscillatable about an axis XY which may be substantially vertically disposed, although not necessarily so, and the intake 14 is caused to rotate in such a manner as to be subjected to all the negative or trailing pressures and also all the positive or leading pressures in one complete revolution of the body around its axis XY. A suitable connection 15, as for instance, a rubber tube, connects the intake 14 with the instrument 12. The intake or nozzle 14 may describe a substantially horizontal plane defined by the letters A—E—F. The pressures thus determined may be plotted and curves drawn therethru as indicated in Fig. 2. The record thus made is observed to have two minimum or negative values to each positive wave, the positive waves being indicated at 16 and the negative waves at 17 and 18. Between the waves 17 and 18 there are negative pressure points which are of greater value than the minimum points 17 and 18. In fact, immediately in the rear of the body 13 there is a point where the pressure is slightly above the neutral line, as indicated by the curves. In other words, as the nozzle 14 passes thru the trailing position or to the rear of the instrument the pressure first decreases to the point 17, then increases to the point 19 and then decreases to the point 18, such irregularity being due to the air flow around the instrument. Obviously maximum suction or negative pressure is in evidence at the points where the air stream, in flowing around the instrument begins to leave its surface, and between such points, due to eddying, the negative pressure gradually falls off until at the exact center of the trailing portion slight positive pressure actually exists. Since the waves 16 indicate an apparent pressure greater than the true static pressure and the waves 17 and 18 indicate apparent pressures lower than the true static pressures a median or average line may be drawn thru this wavy line to indicate the true static pressure from which the true altitude of the craft may be determined. Such a line is indicated at 20. The correct positioning or determination of this line 20 may be fixed by calibrating the instrument as for instance by wind tunnel tests.

In Fig. 2 is illustrated on a large scale a portion of the record produced in accordance with my invention and by means of the apparatus indicated in Fig. 3, and I have indicated a number of records embodying waves of different amplitudes corresponding to the different air speeds of the instrument or craft, the rotation of the instrument being assumed to be uniform in all instances and at the same rate. The aerodynamic pressures above (and below) the median or average true static pressure line are functions of the air velocity and accordingly the instrument may be calibrated for determining the air speeds. The amplitude of the waves may thereby be considered as the correct measurement or determination of the speed relatively to the air. I have indicated in Fig. 2 the wave record of different amplitudes which may be considered as calibrated and corresponding to 30, 60, 90 and 120 M. P. H. It is understood that the instrument may be calibrated in a wind tunnel to give the accurate speed indications.

I have also illustrated in Fig. 2 a portion of a curve on ascent to indicate how the record also gives the rate of climb. Assuming that the instrument revolves or oscillates at a uniform rate the curve crosses the average line 20, as for instance points B and C, at equal intervals of time. The ratio of the vertical distance to the horizontal distance between these parts, viz; $\frac{\Delta x}{\Delta t}$ gives the rate of climb.

In Fig. 4 I have illustrated a specific apparatus for carrying the record sheet 10 and producing thereupon the record 11, this apparatus embodying a static pressure instrument of the aneroid barometer type and having the usual drum 21 for carrying the record sheet 10 and having a recording needle carrier 22. The instrument in this instance is illustrated as mounted as a whole in a substantially sealed spherical casing 23 which may be conveniently made into hemispherical halves which are secured together by a zone band 24. The instrument, together with the casing as a whole is mounted upon a trunnion 25 for rotation in a bearing 26 as indicated. The bearing 26 comprises a flange 27 or other suitable means for attaching the instrument to the aircraft. The casing 23 is substantially sealed to the atmospheric air except thru an intake opening 28, this opening being provided thru the zone band 24, and substantially on the center of the casing midway of the top and bottom. Instead of a single opening, one or more openings may be provided, if desirable in certain cases. It is understood that the casing 23 together with the recording barometer enclosed therein is rotated about a substantially vertical axis in any suitable manner, as for instance by conventional clockwork or other suitable mechanism, the details of the driving mechanism 29 Fig. 5 being omitted in the drawings for convenience in illustration. By the rotation of the spherical casing about the vertical axis the nozzle or intake 28 is alternately and successively subjected to the trailing and leading pressures, and accordingly the recording needle is caused to produce a record similar to the wavy lines illustrated in the drawings. It is understood, however, that the apparatus illustrated is for illustrative purposes only and that the invention may be carried out by other types of static measuring instruments and by different arrangements for measuring and recording the leading and trailing pressures, and thereby taking into account the errors due to aerodynamic pressures or the flow of air past the instrument.

In accordance with the requirements of the patent statutes I have set forth one embodiment of my invention in this application, but it is understood that the invention is capable of assuming other forms than that set forth and illustrated and that the claims appended hereto are intended to cover all such forms, due regard being had to a consideration of the prior art.

What is claimed is:

1. The method of determining the true barometric pressure around a body moving through the air which consists in measuring both the leading and the trailing air pressures and striking an average of the values of these pressures.

2. The method of determining the true barometric pressure around a body moving through the air which consists in measuring the atmospheric pressure at a point on the body where the static pressure is less than the atmospheric pressure, in measuring the atmospheric pressure at another point on the body where the static pressure is comparatively greater than the atmospheric pressure, and determining from the two pressures thus measured, the true static pressure.

3. The method of simultaneously determining the true barometric pressure around a body moving through the air and the air velocity thereof which consist in successively measuring and recording the pressures at predetermined points both leading and trailing of said body, and in determining from the values of the pressures thus measured and recorded, the true static pressure.

4. The method of simultaneously determining the true barometric pressure, the air velocity and speed of climb of aircraft which consists in measuring and recording air pressures at predetermined points both leading and trailing of said body, the measurements being taken at equal intervals of time, and in determining, by integration, from the values of the pressures thus obtained, the true static pressure.

5. The method of simultaneously determining the true barometric pressure, the air velocity and speed of climb of aircraft which consists in measuring and recording the air pressure at predetermined points both leading and trailing of a body mounted in the free air stream, the measurements being taken at substantially equal intervals of time, and in determining, by striking an average of the values of the pressures thus measured and recorded, the true static pressure.

6. The method of determining the air velocity of aircraft which consists in successively measuring and recording the air pressure at predetermined points both leading and trailing said craft and in determining, by integration, from the pressure values thus measured and recorded, the true static pressure.

7. In an aircraft, the combination of a measuring instrument whose readings are affected by the fluctuations in aerodynamic pressures, with means for movably mounting the instrument intake, and a positive operating means whereby said intake may be actuated to two or more positions wherein the fluctuations in aerodynamic pressures substantially differ.

8. In an aircraft, the combination of an aneroid recording barometer enclosed in a substantially air-tight casing, said casing being rotatably mounted upon said aircraft and having an intake on one side thereof, with means for rotating said casing whereby said intake is successively subjected to leading and trailing pressures and the instrument is caused to record a wavy line due to the fluctuations of aerodynamic pressures in going from the leading to the trailing side of the meter.

9. In a measuring apparatus of the type set forth, the combination of a pressure indicating instrument, with a body moving through the air, said body having an intake for said pressure indicating instrument which is adapted to induct air from points both trailing and leading of said moving body, and means to move said body.

10. In a measuring apparatus for aircraft, the combination of a pressure measuring instrument, a body mounted in the free air stream of said aircraft, and an intake for said pressure measuring instrument adapted to be subjected to air pressures both trailing and leading with respect to said body, and means to move said body.

11. In a measuring apparatus for aircraft, the combination of a pressure measuring instrument, a body mounted in the free air stream of said aircraft, an intake for said pressure measuring instrument adapted to be subjected to air pressures both trailing and leading with respect to said body, and means to move said body whereby said intake is alternately subjected to said trailing and leading air pressures at substantially equal intervals of time.

In testimony whereof I hereunto affix my signature.

JOSEPH G. COFFIN.